United States Patent

[11] 3,592,295

[72] Inventor Richard Kennel
43-77 165 St., Flushing, N.Y. 11358
[21] Appl. No. 839,897
[22] Filed July 8, 1969
[45] Patented July 13, 1971

[54] WEAR SIGNALLING DEVICE FOR VEHICLE BRAKE LINING
2 Claims, 5 Drawing Figs.

[52] U.S. Cl. .................................................. 188/1 A,
116/67 R, 116/114 Q
[51] Int. Cl. .................................................. F16d 66/02
[50] Field of Search .......................................... 116/67,
114, 16; 188/1 A

[56] References Cited
UNITED STATES PATENTS
| | | | |
|---|---|---|---|
| 3,381,653 | 5/1968 | Rike | 188/1 (A) X |
| 3,385,256 | 5/1968 | Forbush | 188/1 (A) X |

Primary Examiner—Duane A. Reger
Attorney—Edward G. Roe

ABSTRACT: A device for indicating wear of a brake lining on a brakeshoe which contacts a brakedrum including an elongated wire spring of C-shape with means at one end for attachment to the brakeshoe and as an angular extension at its outer end whose terminal contacts the brakedrum attached to a rotating vehicle wheel, to produce an audible signal. The device has means for retaining the ends close to each other under a bending stress to space the second end from said drum, and means to release the wire when the brake lining has worn to a predetermined minimum thickness.

PATENTED JUL13 1971 3,592,295
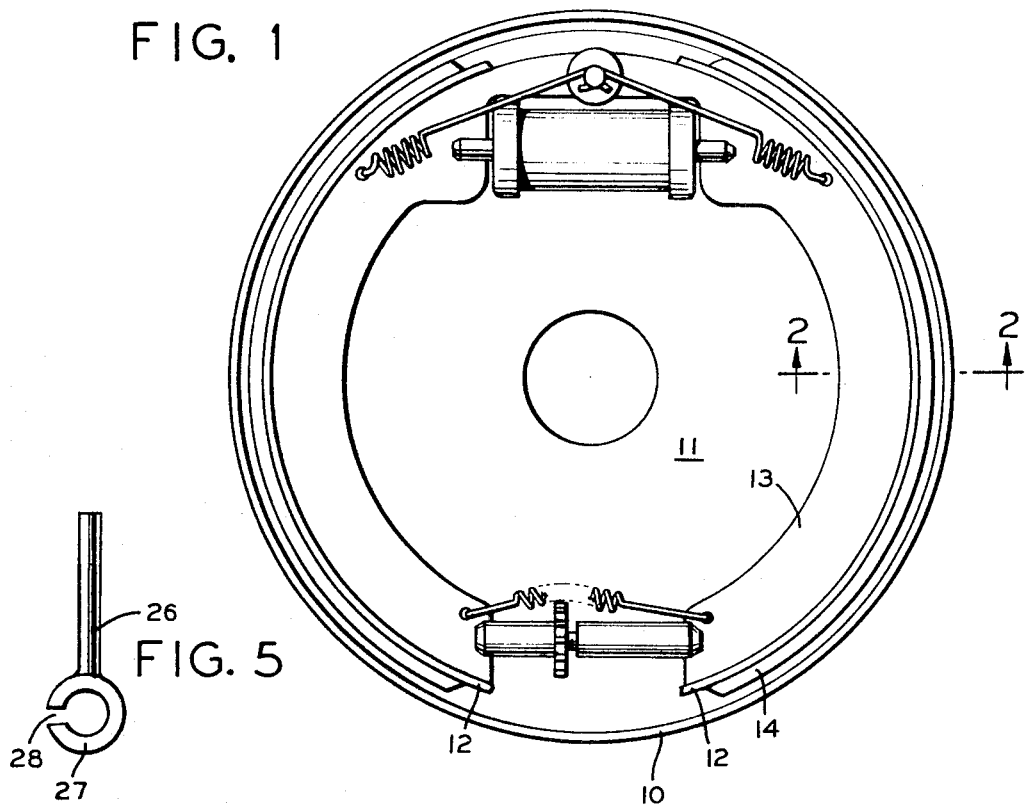
FIG. 1
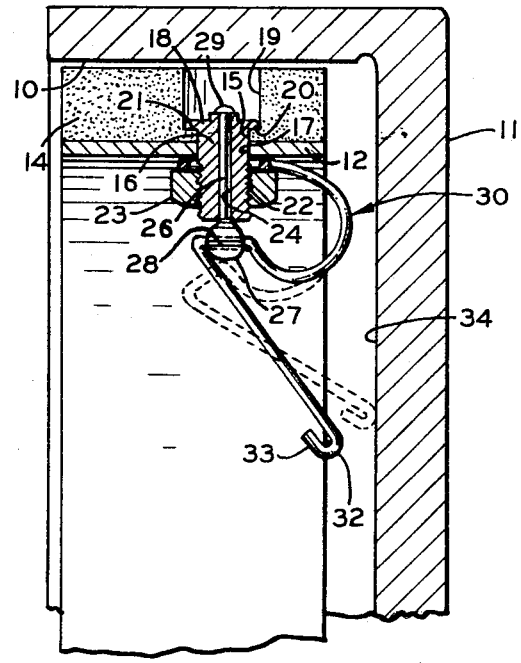
FIG. 2
FIG. 5
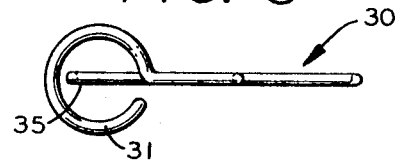
FIG. 3
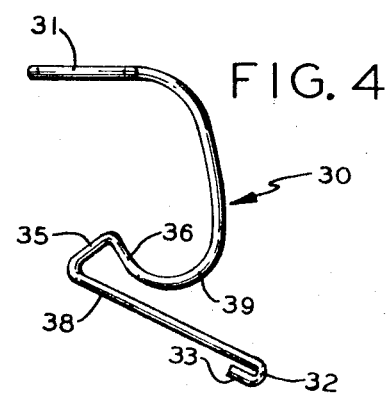
FIG. 4
INVENTOR.
RICHARD KENNEL
BY: JOHN P. CHANDLER
HIS ATTORNEY.

WEAR SIGNALLING DEVICE FOR VEHICLE BRAKE LINING

This invention relates to a wear indicating signalling device for vehicle brake linings, and its primary purpose is to provide a simplified arrangement which can be readily installed in a vehicle during manufacture or at a later date when the brake lining has reached such a state of wear as to require placement.

The problem is sufficiently serious as to have attracted the attention of a considerable number of workers in the field in an effort of find a solution. Interesting devices of this character are disclosed in U.S. Pat. Nos. 3,385,256 and 3,407,906, among others.

Some of the more complicated devices of this character provide an electrical circuit to actuate a signalling system. It is important, however, to provide a safe device which requires no attention and which is inexpensive to construct and easy to install. These desired ends achieved by the device of the present invention.

In the drawing:

FIG. 1 is a side elevation of a brakedrum showing the position of the assembly of the present invention.

FIG. 2 is a section taken on line 2–2 of FIG. 1.

FIG. 3 is a plan view of a partially captive wire spring which on release produces the warning sound.

FIG. 4 is a side elevation thereof.

FIG. 5 is a side elevation of the trigger release pin.

The annular brakedrum is shown at 10 and it has the usual end wall 11 forming, in effect, a closure for the drum. There are two brakeshoes 12 positioned within the drum, as shown in FIG. 1. These brakeshoes are movable against the annular surface of the drum with increasing or decreasing pressure by conventional means. As shown in FIG. 1 the shoe has the usual web 13 and supports a brake lining 14 which is secured to the shoe by means of the conventional rivets (not shown) passing through holes in the brake lining. In accordance with this invention, one of their rivets is replaced, by the assembly of the present invention. The rivet hole 15 in the brake lining is of such a size as to readily receive a stud 16 which passes through said hole 15 and an aligned hole 17 in the brakeshoe 12. The stud has a head 18 which is received within an enlarged section of counterbore 19 of hole 15 in brake lining 14. The flat annular underface 20 of the stud head engages the relatively thin wall 21 which remains at the lower end of the counterbore.

The stud is externally threaded as shown at 22 and receives a nut 23. The stud has a through bore 24 which receives a trigger release pin 26 of special configuration and which can be made from soft aluminum or other metal. A head 27 is formed at the inner end of the pin and it has an external diameter slightly less than the diameter of the stud so that the assembled stud and pin readily pass through the holes 15 and 17. This single stud, received in place by nut 23 is the only part that may be installed and the assembly is complete. The head has a sidewall slot 28. The upper end of the trigger release pin is peened over to form a slightly enlarged terminal or abutment 29 which cannot pass downwardly through hole 24. A partially captive wire spring 30 of irregular shape has at its upper end a ring 31 which is received on the stud in secured relation by means of nut 23. The opposite end 32 of the wire spring has a bent back section 33. This terminal section, when the spring is not under a bending stress, engages the inner face 34 of the end wall 11 of the brakedrum. The brakedrum rotates with the wheel, and rubbing contact between the wire terminal 32 and the surface 34 makes an audible signal.

The following means are provided for releasably grasping the middle section of the spring and keeping it captive under a bending stress with the doubled back ou ter terminal section 32, spaced from the end wall 34 of the brakedrum so that there is no audible signal. Between its ends, the wire spring has a central section which may be described as being of hairpin contour with a straight connecting section 35 and legs 36 and 38. Leg 36 merges into a generally C-shaped section 39 leading up to ring 31 and leg 38 is substantially straight and leads to terminal 32. When the parts are initially assembled, and the spring with its special configuration is not under a bending stress, it has the contour shown in FIG. 4. The spring can now be armed by grasping short section 35 and moving it upwardly, and inserting it into slot 28. The spring is now under a bending stress and this causes lower leg 38 to move upwardly and slightly to the left when viewed as in FIG. 2. This causes the terminal 32 of the spring to move from the dotted line position where it is in rubbing contact with the side of the brakedrum, into the full line portion where it is spaced from this flat surface. After the device has been armed by placing short section 35 in slot 28, the jaws on opposite sides of slot 28 in the head 27 may be closed around the wire by the aid of pliers. This prevents the trigger release pin from becoming loose from vibration or when abutment 29 has been ground off.

During operation, the brake lining 14 mounted on the brakeshoe continues to wear but no moving metal parts contact the inner annular face of the brakedrum. After a time, the wear has continued until the enlarged abutment 29 touches the surface of the brakedrum, and friction between the rotating drum and the abutment grinds off the abutment in a rather short time. This frees the trigger release pin for downward travel and the terminal 32 contacts the rotating surface 34 producing the audible sound.

The operator of the vehicle is now aware that a new brake lining must be installed which he does as soon as is convenient. During this interim period, doubled-back portion 33 acts as a stop to prevent the trigger release pin from becoming loose in the area.

In the newly lined brake the single stud 16, equipped with a new trigger release pin, can be re used and when this single stud is in place and the nut tightened the assembly is complete.

What I claim is:

1. A device for indicating wear of a brake lining on a riveted brakeshoe comprising;
    an elongated wire spring having a C-shaped portion and an elongated portion,
    a trigger-release pin demountably retaining said spring between its C-shaped portion and its elongated portion;
    a threaded stud having an aperture for receiving said trigger release pin, said stud bolted through said brakeshoe and retaining the free end of said C-shaped portion of said spring, so that when the end of said release pin mounted in said threaded stud becomes worn, said release pin will be pulled through the aperture of said threaded stud by the force of said C-shaped portion, thereby permitting the elongated portion of said wire spring to contact the brakedrum and produce an audible signal.

2. A device for indicating wear of a brake lining on a riveted brakeshoe as described in claim 1 wherein the diameter of the rivet bolt in the brakeshoe which is removed prior to application of the apparatus is equal to the diameter of the threaded stud of the apparatus which is placed in the cylindrical opening of the brakeshoe.